US006959916B2

(12) United States Patent
Chigasaki et al.

(10) Patent No.: US 6,959,916 B2
(45) Date of Patent: Nov. 1, 2005

(54) VALVE AND MANUFACTURING METHOD THEREOF

(75) Inventors: Mitsuo Chigasaki, Hitachi (JP); Shizuo Matsushita, Hitachi (JP); Jiro Kuniya, Hitachi (JP); Yoshihisa Kiyotoki, Hitachinaka (JP); Kikuo Takeshima, Hitachi (JP); Akira Sakamoto, Mito (JP); Yoshiteru Chiba, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 10/288,397

(22) Filed: Nov. 6, 2002

(65) Prior Publication Data

US 2003/0132415 A1 Jul. 17, 2003

(30) Foreign Application Priority Data

Jan. 11, 2002 (JP) .......................................... 2002-004034

(51) Int. Cl.$^7$ .............................................. G12C 15/00
(52) U.S. Cl. ........................................ 251/368; 137/375
(58) Field of Search ............................ 251/368; 137/375

(56) References Cited

U.S. PATENT DOCUMENTS

| 3,678,570 A | 7/1972 | Paulonis et al. |
| 4,754,950 A | 7/1988 | Tada et al. |
| 5,633,094 A | 5/1997 | Takeshima et al. |

FOREIGN PATENT DOCUMENTS

| EP | 1 128 103 | 8/2001 |
| EP | 1 128 103 A2 | 8/2001 |
| EP | 1 193 316 | 4/2002 |
| JP | 11-063251 | 3/1999 |

*Primary Examiner*—Eric Keasel
(74) *Attorney, Agent, or Firm*—McDermott Will & Emery LLP

(57) ABSTRACT

A valve which is cobalt-free excellent in wear resistance and seizure resistance manufactured by forming valve seats for a valve disc and a valve body with a nickel base alloy in which silicide particles or boride particles of small particle size are finely dispersed, and the valve seat is bonded to the valve disc or the valve body by way of an insert material comprising a nickel base alloy of a lower melting point by transient liquid phase diffusion bonding.

30 Claims, 3 Drawing Sheets

VALVE AND MANUFACTURING METHOD THEREOF

BACKGROUND OF THE INVENTION

The present invention relates to a valve and a manufacturing method thereof and, more in particular, it relates to a material used for a valve seat and a method of forming the valve seat. The valve according to this invention can be used in fluid machines such as turbines, pumps or blowers, internal combustion engines, chemical plants or nuclear power plants.

Valves are required to cause less abrasion and less seizure. It is also necessary that they cause less clinging and less erosion. It is preferred that they are also highly corrosion resistant. For safety relief valves, globe valves, gate valves, check valves, control valves, relief valves or butterfly valves used for various fluid machines, chemical plants or nuclear power plants, those having cobalt alloys referred to as stellite build-up welded to valve seats have been used so far. Further, since there is a worry for the exhaustion of cobalt resources and nuclear power plants are required to have cobalt free constitution, so that development of valve seat materials not containing cobalt has been demanded.

Japanese Patent Laid-Open No. Hei 11-63251 discloses use of an alloy formed by dispersing chromium boride particles to a nickel base alloy containing chromium, boron, and silicon as a valve seat material, which is build-up welded to a valve disc or a valve body. Further, Japanese Patent Laid-Open No. Sho 62-1837 and U.S. Pat. specification No. 4,754,950 disclose valves in which a valve seat for one of valve disc and valve body are formed of chromium-nickel-iron series iron-based precipitation hardened type alloy and the valve seat for the other of them is formed of a nickel base alloy having a hardness (Hv) of 400 or more. It is described that the nickel base alloy having a hardness (Hv) of 400 or more contains carbon, silicon, boron and chromium. It is also described that the nickel base alloy is bonded to the valve body or the valve disc by build-up welding, brazing or diffusion bonding. However, what is shown concretely is only those bonded by build-up welding.

The inventors of this invention have confirmed that a nickel base alloy in which one or both of silicide particles and boride particles are finely dispersed in a matrix of a metal microstructure has a ductility, is highly resistant to thermal shock or mechanical impact, excellent in wear resistance and seizure resistance and suitable for the use for valve seats. However, in a case of build-up welding the nickel base alloy in which silicide particles or boride particles are dispersed to the valve seat, it has been found that the nickel base alloy is melted upon welding to form a coarse dendritic solidified microstructure containing suicides or borides. The nickel-base alloy having the dendritic solidified microstructure is poor in the ductility, sensible to thermal shock or mechanical impact, and liable to be fractured.

This invention intends to provide a method of manufacturing a valve capable of maintaining a state where silicide particles or boride particles are finely dispersed without forming the dendritic solidified microstructure even in a case of using a nickel base alloy in which at least one of silicide particles and boride particles is dispersed in the matrix of a metal microstructure as a valve seat, and bonding the same to a valve disc or a valve body, as well as a valve obtained by the manufacturing method.

SUMMARY OF THE INVENTION

In a valve according to this invention, a valve seat comprising a nickel base alloy in which at least one of silicide particles and boride particles is dispersed in a matrix of a metal microstructure and a valve disc or a valve body are diffusion bonded, particularly preferably, bonded by transient liquid phase diffusion bonding by way of an intermediate insert layer having a melting point lower than that of them.

In the transient liquid phase diffusion bonding, only the intermediate layer is melted and the material of the valve seat and the valve disc or the valve body is not substantially melted. Accordingly, the material of the valve seat has substantially an initial state before bonding also after the bonding. Further, in the transient liquid phase diffusion bonding, since a portion of alloying elements contained in the material for the valve seat and a portion of alloying elements contained in the material of the valve disc or the valve body diffuses into the intermediate layer, a strong bonded portion can be obtained in view of the strength.

When a plate material as an intermediate layer (hereinafter referred to as an insert material) is interposed between the valve seat and the valve disc or between the valve seat and the valve body and heated to a temperature higher than the melting point of the insert material, the insert material is melted in the initial stage but since the alloying elements contained in the valve seat, the valve disc or the valve body are diffused into the molten portion, the melting point becomes higher and the material coagulates and solidifies during bonding. When the thus manufactured valve is heated to the melting point of the insert material, the insert material is no more melted.

For the material of the valve disc or the valve body, carbon steel or low alloy steel is usually used. Stainless steel is used sometimes. In view of the above, it is desirable for the material of the insert material to use those materials to which alloying elements contained in the nickel base alloy used for the valve seat or carbon steel, low alloy steel or stainless steel used for the valve disc or valve body are diffused easily. A nickel base alloy comprising nickel, silicon and boron, a nickel base alloy comprising nickel, chromium, silicon, and boron, or a nickel base alloy comprising nickel and phosphorus is extremely suitable as the insert material in this invention. The insert material made of a nickel base alloy is excellent also in view of the corrosion resistance. In the examples of manufacturing valves by using the insert materials described above, it was observed a phenomenon that the alloying elements contained in the material of the valve seat and the alloying elements contained in the material of the valve disc or the valve body were diffused in the insert material. Further, even when the manufactured valve was heated up to the melting point of the insert material, the joined portion was not melted. The transient liquid phase diffusion bonding is desirably conducted in a vacuum. Further, it is preferred to apply heating while giving a pressure to the bonded portion. The pressing force may be several tens grams/cm$^2$ and may be utmost 100 /cm$^2$ or less. Accordingly, there is no worry that the bonded portion is deformed or the material of the valve seat is cracked by pressing.

While there may be considered brazing as a bonding method similar with the liquid phase diffusion bonding, but brazing is not suitable since brazing material has to be used and alloying elements contained in the material for the valve seat, valve disc or the valve body are not diffused utterly diffused scarcely into the brazing material, and the strength of the bonded portion is extremely low and the valve seat tends to be flaked.

Upon transient liquid phase diffusion bonding, it is desirable that the thickness of the insert material is thin in order to facilitate melting of the insert material and in order not to release the molten insert material to the out side of the bonded portion and the thickness is preferably within a range from 20 to 50 µm.

There is no particular restriction on the form of the compound of silicide particles or boride particles to be dispersed into the nickel base alloy of the valve seat. A compound of nickel and boron, compound of nickel and silicon or a compound of chromium and boron can be dispersed.

For the nickel base alloy of the valve seat, it is preferred to use a nickel base alloy containing 8% by weight or less of silicon, 0 to 4% by weight of boron, 7 to 30% by weight of chromium, 1.2% by weight or less of carbon, 0 to 5% by weight of tungsten and 42% by weight or less of iron (within a range not exceeding the amount of nickel) in which at least silicide particles are dispersed into the matrix of the metal microstructure. The nickel based alloy of the chemical composition described above is excellent in the ductility and highly resistant to mechanical impact or thermal shock. Further, it has small friction coefficient causing less clinging. It also has a hardness of Hv 400 or more and excellent in wear resistance and erosion resistance. The reason for defining the chemical composition of the nickel base alloy as described above is shown below.

Silicon and boron are contained for improving the ductility and the erosion resistance by dispersing a silicide or boride comprising, for example, $Ni_3Si$, $Ni_2B$, or $Cr_2B$ into the matrix of the metal microstructure. It is more effective to disperse the silicide than the boride, and accordingly, silicon is always contained. The amount of silicon is preferably 8% by weight or less and when it is contained in excess of 8% by weight, the effect of improving the ductility is poor. When boron is contained by 4% by weight or less, the effect for improving the ductility is remarkable.

Chromium improves the corrosion resistance and also strengthens the matrix. When the amount of chromium is less than 7% by weight, the effect is poor and when it exceeds 30% by weight the ductility is lowered, so that a range from 7 to 30% by weight is preferred.

Carbon is contained in order to increase the mechanical strength and the wear resistance. Incorporation of carbon forms, for example, chromium carbides to strengthen the material. When carbon is containing excess of 1.2% by weight, the ductility is worsened.

Tungsten has an effect of strengthen the matrix. However, when it is contained in excess of 5% by weight, the material tends to be brittle.

Iron is contained as a reinforcing element in a range of 42% by weight or less. However, the blending amount should be determined while considering the content of other alloying elements so that it is not more than the amount of nickel. When the amount of iron is excessive, the ductility is lowered and the corrosion resistance is also worsened.

The nickel base alloy used for the valve seat is preferably prepared by producing a nickel base alloy powder by an atomizing process followed by compression molding and, further, applying an HIP (Hot Isostatic Press) treatment and hot powder extrusion to prepare a plate material. Further, it is preferred to apply hydrostatic extrusion to an ingot of a vacuum-melted nickel base alloy and further apply hot pressing into a plate material. In the thus produced plate material, metal microstructure is fine, and silicide particles or the boride particles are dispersed as granular or lumpy particles at the order of several tens µm or less into the matrix of the metal microstructure. Since the metal microstructure becomes fine, hardness is further improved and the erosion resistance is also improved.

The particle size of the silicide particles and the boride particles gives an effect on the ductility and the ductility is improved more as the particle size is finer. In the valve according to this invention, the grain size of the silicide particles and the boride particles is preferably 30 µm or less. The nickel base alloy containing such fine silicide particles or boride particles has a ductility of about 1.5 times or more compared with a nickel base alloy having a dendritic solidified microstructure containing silicides or borides.

It is highly desirable to form a valve seat for one of the valve disc and the valve body with a nickel base alloy containing 8% by weight or less of silicon, 0 to 4% by weight of boron, 7 to 30% by weight of chromium, 1.2% by weight or less of carbon, 0 to 5% by weight of tungsten and 10% by weight or less of iron in which at least silicide particles are dispersed in the matrix of the metal microstructure and form a valve seat for the other of them with a nickel base alloy containing 8% by weight or less of silicon, 0 to 4% by weight of boron, 7 to 30% by weight of chromium, 1.2% by weight or less of carbon, 0 to 5% by weight of tungsten and 25 to 42% by weight of iron (within a range not exceeding the amount of nickel) in which at least silicide particles are dispersed in a matrix of the metal microstructure, and this can provide an effect of causing less seizure and showing less friction coefficient.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

EXAMPLE 1

A powder of an Ni base alloy containing, on the weight percent basis, 6.8% of Si, 0.9% of B, 18% of Cr, 0.3% of C, 1.5% of W and 6.5% of Fe with the balance of Ni and inevitable impurities was produced by an atomizing process. The atomized powder with a particle size distribution from 80 to 200 mesh described above was used and put to compression molding (8000 $kg/cm^2$: pressure) at a normal temperature and then applied with an HIP treatment and hot powder extrusion at a temperature of about 900° C., intended for compaction of the powder and reduction of the porosity. The extruding pressure was about 5000 $kg/cm^2$ and the stem velocity is 10 mm/sec. According to the observation for the metal microstructure after the HIP treatment and extrusion fabrication, it was confirmed that the suicides were dispersed in the granular or lumpy form with a particle size of 10 µm or less into the matrix of the metal microstructure. When elongation was measured by a tensile test, it was 0.7% and it was confirmed that the ductility was excellent by 1.5 times or more compared with the case having the dendritic solidification microstructure. The hardness was about Hv 580. A ring of 5 mm thickness was cut out of the nickel base alloy and bonded to a valve disc made of carbon steel by the transient liquid phase diffusion bonding method to be described later.

Figure 1:
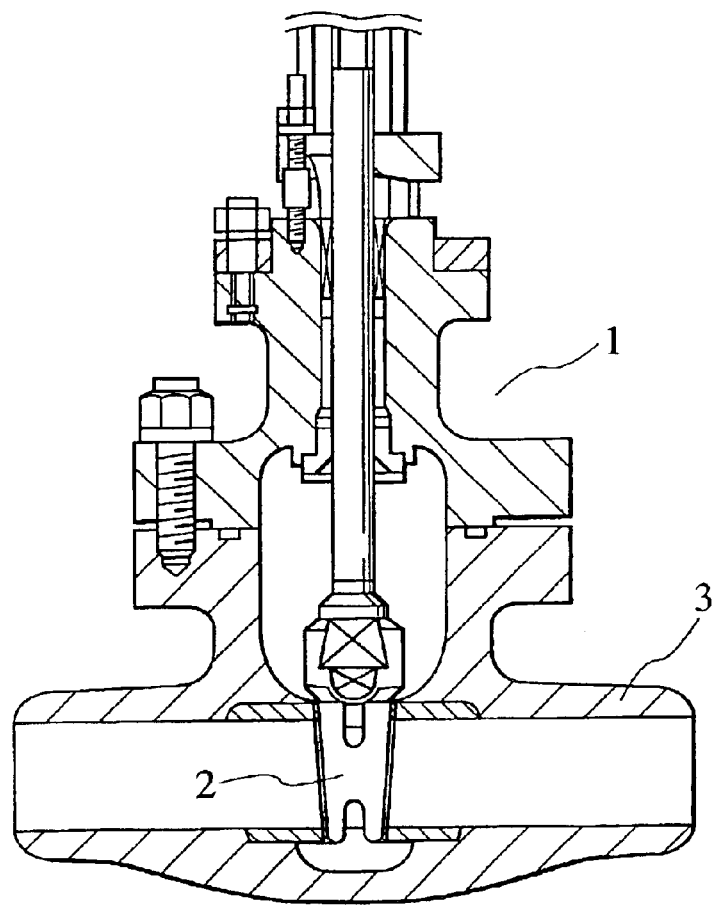
FIG. 1 is a cross sectional view of a gate valve in a preferred embodiment according to this invention.
Figure 2:
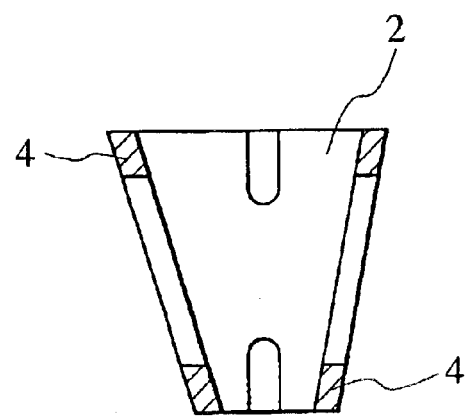
FIG. 2 is an enlarged view of a valve disc in the gate valve in FIG. 1.
Figure 3:
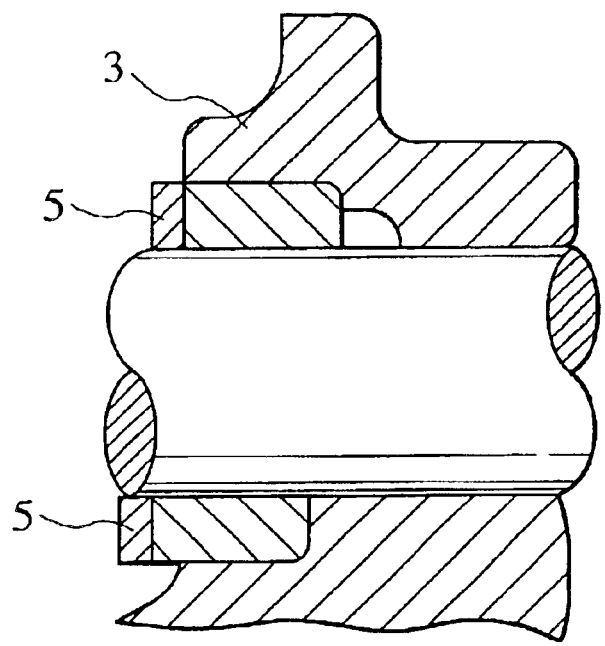
FIG. 3 is an enlarged view of a valve body in the gate valve in FIG. 1.

Further, an ingot of an Ni base alloy containing, on the weight % basis, 4.4% of Si, 0.2% of B, 12% of Cr, 0.7% of C, 1.6% of W and 38% of Fe with the balance being Ni and inevitable impurities was prepared by a vacuum melting, applied with hydrostatic extrusion at a temperature of about 900° C. and then further applied with hot press fabrication at a temperature of about 900° C. again. According to the observation for the metal microstructure, it was confirmed that silicide particles with a grain size of 10 $\mu$m or less were dispersed in the granular or lumpy form into the matrix of the metal microstructure. A ring of 5 mm thickness was cut out of the nickel base alloy and bonded to a valve body comprising carbon steel by a transient liquid phase diffusion bonding method to be described later. Then, a gate valve of a structure as shown in FIG. 1 to FIG. 3 was produced. FIG. 1 is a cross sectional view of a gate valve, FIG. 2 is an enlarged view of a valve disc and FIG. 3 is an enlarged view of the valve body.

Figure 4:
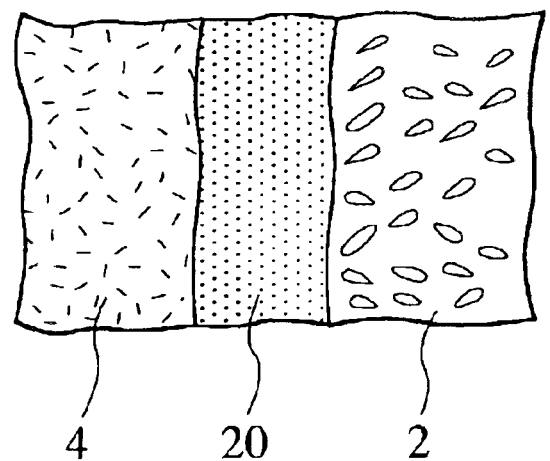
FIG. 4 is a schematic view showing a bonded portion between a valve disc and a valve seat.

The gate valve 1 of this embodiment comprises a valve disc 2 and a valve body 3, and has a valve seat 4 on the side of the valve disc and a valve seat 5 on the side of the valve body. It is adapted such that the valve is opened by upwardly extracting the valve disc 2 from the state shown in FIG. 1 to flow liquidus or gaseous fluid. The material for the valve disc 2 and the valve body 3 comprises carbon steel at a carbon content of 0.25% by weight (SCPH 2) according to JIS standards (corresponding to S25C) which is castings. Bonding between the valve disc 2 and the valve seat 4 and bonding between the valve body 3 and the valve seat 5 were conducted by interposing an insert material made of a nickel base alloy containing 4.5% by weight of Si and 3.2% by weight of B and the balance of Ni between the bonding surfaces in each case. The thickness of the insert material was about 40 $\mu$m. The solidus line temperature was about 970° C. and the liquidus line temperature was about 1000° C. for the insert material. The transient liquid phase diffusion bonding was conducted under the conditions at a bonding temperature of 1040° C., for a retention time of one hour, with a vacuum of $2 \times 10^{-4}$ Torr and at a pressing force for the bonded portion of 80 g/cm$^2$. The insert material was melted in the initial stage when it reached about 1000° C. Then, since alloying elements contained in the material of the valve disc and the valve seat were diffused in the molten portion, to rise the melting point of the molten material thereby solidify and return the same to a solid during bonding. FIG. 4 schematically shows a state where the valve disc 2 and the valve seat 4 are bonded by way of the insert material and an intermediate layer (insert material) 20 is present between the valve disc 2 and the valve seat 4.

According to the microstructure observation for metal in the bonded portion, it was confirmed that silicide particles and the boride particles were retained being finely dispersed in the nickel base alloy of the valve seat and that the materials of the valve seat and the valve disc were diffused in the insert material. Defects such as voids were not observed in the bonded portion.

Friction coefficient in water at high temperature was measured for a gate valve manufactured according to this example and a gate valve formed by cutting out a welding electrode from the nickel base alloy obtained in the process of this invention and build-up welded to the valve disc and the valve body to form a valve seat. The test surface pressure was 2000 kg/cm$^2$ and the sliding speed was 300 mm/min. As a result, it was found that while the friction coefficient was 0.41 to 0.45 in the comparative example in which the valve seat was formed by build-up welding, whereas the friction coefficient was as small as 0.33 to 0.35 and clinging was less formed in this example.

The gate valve according to this example causes less corrosion by dissolving oxygen and is suitable to use for nuclear power plants.

EXAMPLE 2

Figure 5:
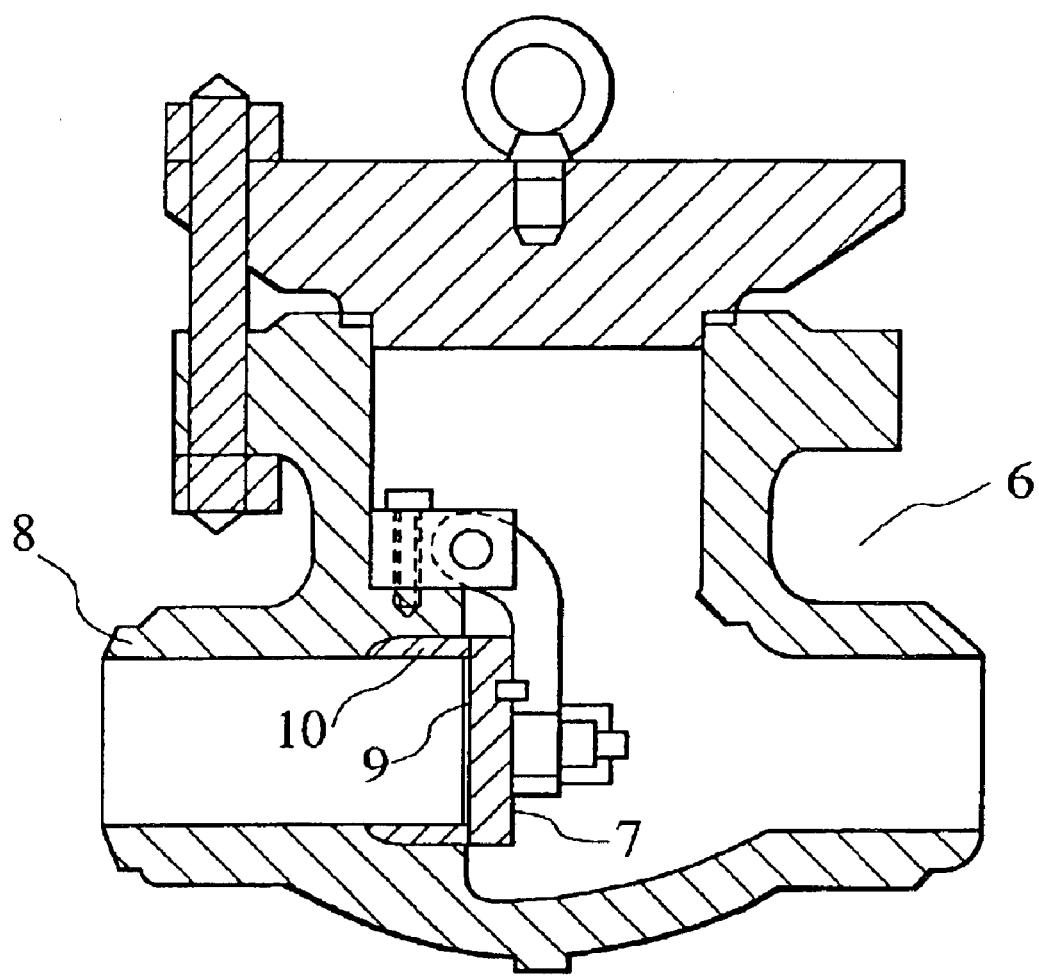
FIG. 5 is a cross sectional view of a check valve in another embodiment according to this invention.

An ingot made of an Ni base alloy containing, on the weight % basis, 3.5% of Si, 2.5% of B, 12% of Cr, 0.5% of C and 3% of Fe with the balance of Ni and inevitable impurities was prepared by vacuum melting and, after applying hydrostatic extrusion at a temperature of about 900° C., hot pressing was conducted again at a temperature of about 900° C. According to the observation of the metal microstructure, it was confirmed that silicide particles and boride particles with the particle size of 10 $\mu$m or less were dispersed in the granular or lumpy form in the matrix of the metal microstructure. Elongation of the nickel base alloy was about 0.7%. A ring of 5 mm thickness was formed by cutting out of the nickel base alloy and bonded to a valve disc and a valve body by transient liquid phase diffusion bonding. The materials of the valve disc and the valve body comprised a carbon steel with a carbon content of about 0.25% by weight, which were castings. According to this example, a check valve of a structure shown in FIG. 5 was manufactured. The check valve 6 comprises a valve disc 7 and a valve body 8 in which a valve seat 9 is bonded to the valve disc 7 and a valve seat 10 is bonded to a valve body 8. Fluid flows when opening the valve disc 7 from the state shown in FIG. 5. Transient liquid phase diffusion bonding was conducted while interposing the insert material between the valve disc 7 and the valve seat 9 and between the valve body 8 and valve seat 10 under the conditions at a bonding temperature of 950° C., for a retention time of 1 hour, with a vacuum of $2 \times 10^{-4}$ Torr and at a pressing force of 50 g/cm$^2$. For the insert material, an Ni base alloy containing 11% by weight of phosphorus and the balance of nickel was used. The liquidus phase line temperature and the solidus line temperature of the insert material were substantially identical about 875° C.

According to the observation for metal microstructure conducted after the bonding, it was confirmed that the alloying elements contained in the materials for the valve seat, the valve disc and the valve body were diffuses to the insert material and bonding defects such as voids were not observed. Since silicide particles and the boride particles of small grain size are finely dispersed in the matrix of the metal microstructure, the check valve according to this invention has a feature that it is highly resistant to thermal shock and mechanical impact and caused less cracks. In addition, corrosion by dissolved oxygen is less caused and it is excellent in the leakage resistance when used in nuclear power plants.

According to this invention, a cobalt free constitution for the valve seat material can be attained. Accordingly, this is suitable to use for a valve in nuclear power plants.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A valve having a valve disc and a valve body, with a valve seat for at least one of them being formed of a nickel base alloy in which compound particles are dispersed, wherein the nickel base alloy comprises a nickel base alloy in which at least one of silicide particles and boride particles are dispersed in the matrix of a metal microstructure, the valve seat made of the nickel base alloy and at least one of the valve disc and the valve body are diffusion bonded by way of an intermediate layer of a melting point lower than that of them, and the nickel base alloy contains 8% by weight or less of silicon, 0 to 4% by weight of boron, 7 to 30% by weight of chromium, 1.2% or less of carbon, 0 to 5% by weight of tungsten and 42% by weight or less of iron (in a range not exceeding the amount of nickel) in which at least silicide particles are dispersed in the matrix of the metal microstructure.

2. A valve as defined in claim 1, wherein the material for the valve disc and the valve body comprises carbon steel, low alloy steel or stainless steel.

3. A valve as defined in claim 1, wherein the silicide particles and the boride particles comprises granular or lumpy particles with particle size of 30 $\mu$m or less.

4. A valve as defined in claim 1, wherein the nickel base alloy used for the valve seat is manufactured by subjecting a nickel base alloy powder prepared by an atomizing process to a compression molding, a hot isostatic pressing treatment and a hot powder extrusion.

5. A valve as defined in claim 1, wherein the nickel base alloy used for the valve seat is prepared by hot isostatic pressing and hot pressing of an ingot of a vacuum-melted nickel base alloy.

6. A valve as defined in claim 1, wherein the material for the intermediate layer comprises one of members selected from a nickel base alloy comprising nickel, silicon and boron, a nickel base alloy comprising nickel, chromium, silicon and boron and a nickel base alloy comprising nickel and phosphorus.

7. A valve as defined in claim 1, wherein the valve seat and the valve disc or the valve body are bonded by transient liquid phase diffusion bonding.

8. A valve as defined in claim 1, wherein the valve is used for nuclear power plants.

9. A valve having a valve disc and a valve body, with a valve seat for at least one of them being formed of a nickel base alloy in which compound particles are dispersed, wherein the nickel base alloy comprises a nickel base alloy in which at least one of silicide particles and boride particles are dispersed in the matrix of a metal microstructure, the valve seat made of the nickel base alloy and at least one of the valve disc and the valve body are diffusion bonded by way of an intermediate layer of a melting point lower than that of them, and one of the valve seats comprises a nickel base alloy containing 8% by weight or less of silicon, 0 to 4% by weight of boron, 7 to 30% by weight of chromium, 1.2% by weight or less of carbon, 0 to 5% by weight of tungsten and 10% by weight or less of iron in which at least silicide particles are dispersed in the matrix of the metal microstructure, the other of the valve seats comprises a nickel base alloy containing 8% by weight or less of silicon, 0 to 4% by weight of boron, 7 to 30% by weight of chromium, 1.2% or less of carbon, 0 to 5% by weight of tungsten and 25 to 42% by weight of iron (in a range not exceeding the amount of nickel) in which at least silicide particles are dispersed in the matrix of the metal microstructure.

10. A valve as defined in claim 9, wherein the material for the valve disc and the valve body comprises carbon steel, low alloy steel or stainless steel.

11. A valve as defined in claim 9, wherein the silicide particles and the boride particles comprises granular or lumpy particles with particle size of 30 $\mu$m or less.

12. A valve as defined in claim 9, wherein the nickel base alloy used for the valve seat is manufactured by subjecting a nickel base alloy powder prepared by an atomizing process to a compression molding, a hot isostatic pressing treatment and a hot powder extrusion.

13. A valve as defined in claim 9, wherein the nickel base alloy used for the valve seat is prepared by hot isostatic pressing and hot pressing of an ingot of a vacuum-melted nickel base alloy.

14. A valve as defined in claim 9, wherein the material for the intermediate layer comprises one of members selected from a nickel base alloy comprising nickel, silicon and boron, a nickel base alloy comprising nickel, chromium, silicon and boron and a nickel base alloy comprising nickel and phosphorus.

15. A valve as defined in claim 9, wherein the valve seat and the valve disc or the valve body are bonded by transient liquid phase diffusion bonding.

16. A valve as defined in claim 9, wherein the valve is used for nuclear power plants.

17. A method of manufacturing a valve by bonding to at least one of a valve disc and a valve body, a valve seat of a nickel based alloy in which compound particles are dispersed, the method comprises using a nickel base alloy in which at least one of silicide particles and boride particles is dispersed in the matrix of the metal microstructure as the nickel base alloy, interposing between the bonded surfaces of the valve seat made of the nickel base alloy and the valve disc or the valve body an insert material with the melting point being lower than that of others and bonding the valve seat to the valve disc or the valve body by transient liquid phase diffusion bonding of heating at a temperature for melting only the insert materials, wherein the method comprises using a nickel base alloy containing 8% by weight or less of silicon, 0 to 4% by weight of boron, 7 to 30% by weight of chromium, 1.2% by weight or less of carbon, 0 to 5% by weight of tungsten and 42% by weight or less of iron (in a range not exceeding the amount of nickel) in which at least silicide particles are dispersed in the matrix of the metal microstructure.

18. A method of manufacturing a valve as defined in claim 17, wherein one of materials selected from a nickel base alloy comprising nickel, silicon and boron, a nickel base alloy comprising nickel, chromium, silicon and boron and a nickel base alloy comprising nickel and phosphorus is used for the insert material.

19. A method of manufacturing a valve as defined in claim 17, wherein the bonding process between the valve seat and the valve disc or the valve body is conducted in a vacuum.

20. A method of manufacturing a valve as defined in claim 17, wherein the insert material comprises a foil with a thickness of 20 to 50 $\mu$m.

21. A method of manufacturing a valve as defined in claim 17, wherein the transient liquid phase diffusion bonding between the valve seat and at least one of the valve disc and the valve body is conducted in a state where the bonded portion is pressed.

22. A method of manufacturing a valve by bonding to at least one of a valve disc and a valve body, a valve seat of a nickel based alloy in which compound particles are dispersed, the method comprises using a nickel base alloy in which at least one of silicide particles and boride particles is dispersed in the matrix of the metal microstructure as the nickel base alloy, interposing between the bonded surfaces of the valve seat made of the nickel base alloy and the valve disc or the valve body an insert material with the melting point being lower than that of others and bonding the valve seat to the valve disc or the valve body by transient liquid phase diffusion bonding of heating at a temperature for melting only the insert material.

wherein the method comprises using a nickel base alloy containing 8% by weight or less of silicon, 0 to 4% by weight of boron, 7 to 30% by weight of chromium, 1.2% by weight or less of carbon, 0 to 5% by weight of tungsten and 10% by weight or less of iron for one of the valve seats, and using a nickel base alloy containing 8% by weight or less of silicon, 0 to 4% by weight of boron, 7 to 30% by weight of chromium, 1.2% by weight or less of carbon, 0 to 5% by weight of tungsten and 25 to 42% by weight or less of iron (in a range not exceeding the amount of nickel) for the other of the valve seats.

23. A method of manufacturing a valve as defined in claim 22, wherein one of materials selected from a nickel base alloy comprising nickel, silicon and boron, a nickel base alloy comprising nickel, chromium, silicon and boron and a nickel base alloy comprising nickel and phosphorus is used for the insert material.

24. A method of manufacturing a valve as defined in claim 22, wherein the bonding process between the valve seat and the valve disc or the valve body is conducted in a vacuum.

25. A method of manufacturing a valve as defined in claim 22, wherein the insert material comprises a foil with a thickness of 20 to 50 μm.

26. A method of manufacturing a valve as defined in claim 22, wherein the transient liquid phase diffusion bonding between the valve seat and at least one of the valve disc and the valve body is conducted in a state where the bonded portion is pressed.

27. A method of manufacturing a valve by bonding to at least one of a valve disc and a valve body, a valve seat made of a nickel base alloy in which compound particles are dispersed, wherein the method comprises using a nickel base alloy in which at least one of silicide particles and boride particles is dispersed in the matrix of the metal microstructures of the nickel base alloy, interposing between surfaces of the valve seat made of the nickel base alloy and the at least one of the valve disc and the valve body an insert material of melting point lower than melting points of the valve seat and the at least one of the valve disc and the valve body, and bonding the valve seat to the at least one of the valve disc and the valve body by transient liquid phase diffusion bonding with heating at a temperature for melting only the insert material, wherein the nickel base alloy used for the valve seat is manufactured by subjecting a nickel base alloy powder prepared by an atomizing process to a hot isostatic pressing treatment.

28. A method as defined in claim 27, wherein the nickel base alloy used for the valve seat is manufactured by further subjecting the nickel base alloy powder prepared by the atomizing process to a hot extrusion.

29. A method of manufacturing a valve by bonding to at least one of a valve disc and a valve body, a valve seat made of nickel base alloy in which compound particles are dispersed, wherein the method comprises using a nickel base alloy in which at least one of silicide particles and boride particles is dispersed in the matrix of the metal microstructure of the nickel base alloy, interposing between surfaces of the valve seat made of nickel base alloy and the at least one of the valve disc and the valve body, an insert material of melting point lower than melting points of the valve seat and the at least one of the valve disc and the valve body, and bonding the valve seat to the at least one of the valve disc and the valve body by treatment liquid phase diffusion bonding with heating at a temperature for melting only the insert material, wherein the nickel base alloy used for the valve seat is manufactured by hot isostatic pressing of an ingot of a vacuum-melted nickel base alloy.

30. A method as defined in claim 29, wherein the nickel base alloy used for the valve seat is manufactured by further subjecting the ingot of the vacuum-melted nickel base alloy to a hot pressing after the hot isostatic pressing.

* * * * *